(12) United States Patent
Hong et al.

(10) Patent No.: US 6,718,114 B2
(45) Date of Patent: Apr. 6, 2004

(54) VARIABLE OPTICAL ATTENUATOR OF OPTICAL PATH CONVERSION

(75) Inventors: Yoon Shik Hong, Kyungki-Do (KR); Sung Cheon Jung, Seoul (KR); Hyun Kee Lee, Kyungki-Do (KR); Jung Hyun Lee, Kyungki-Do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/002,663

(22) Filed: Oct. 31, 2001

(65) Prior Publication Data

US 2003/0031451 A1 Feb. 13, 2003

(30) Foreign Application Priority Data

Aug. 9, 2001 (KR) .................................. 10-2001-47942

(51) Int. Cl.[7] .............................. G02B 6/26; G02B 6/35
(52) U.S. Cl. ......................................... 385/140; 385/23
(58) Field of Search ............................. 385/13, 19, 20, 385/21, 22, 23, 140

(56) References Cited

U.S. PATENT DOCUMENTS

| | | | | |
|---|---|---|---|---|
| 5,923,798 A | * | 7/1999 | Aksyuk et al. | 385/19 |
| 5,943,454 A | * | 8/1999 | Aksyuk et al. | 385/22 |
| 6,222,656 B1 | * | 4/2001 | Eu | 398/9 |
| 6,388,359 B1 | * | 5/2002 | Duelli et al. | 310/309 |
| 6,459,845 B1 | * | 10/2002 | Lee et al. | 385/140 |

* cited by examiner

Primary Examiner—John D. Lee
Assistant Examiner—Jennifer Doan
(74) Attorney, Agent, or Firm—Darby & Darby

(57) ABSTRACT

Disclosed is a path-converted variable optical attenuator comprising: a transmitting fiber for launching an optical signal through a transmitting core; a receiving fiber for receiving the optical signal from the transmitting fiber through a receiving core; and a mirror having a reflector for obstructing the optical signal launched from the transmitting core of the transmitting fiber from proceeding into the receiving core of the receiving fiber, and being displaced in a direction allowing a portion of the optical signal of the transmitting fiber into the receiving fiber to attenuate the optical signal. An optical signal launched from the transmitting fiber to the receiving fiber is reflected to a separate path from paths of transmitting/receiving fibers so that attenuation may not vary according to wavelength.

6 Claims, 5 Drawing Sheets

VARIABLE OPTICAL ATTENUATOR OF OPTICAL PATH CONVERSION

BACKGROUND OF THE INVENTION

1. Field of the Invention

The present invention relates to a variable optical attenuator, and more particularly to a variable optical attenuator of optical path conversion (hereinafter will be referred to as a path-converted variable optical attenuator) that adopts a Micro Electro Mechanical System (MEMS) type and reflects optical signal launched from the transmitting fiber to the receiving fiber to a separate path from paths of transmitting/receiving fibers so that attenuation may not change according to wavelength.

2. Description of the Related Art

In general, an optical attenuator as one of optical communication instruments artificially adjusts the intensity of incident light for a certain magnitude to cause optical loss so that a beam of attenuated light may emerge from the optical attenuator. Accordingly, the optical attenuator optimally adjusts the intensity of light incident on a light receiving element so as to be used in an optical communication network or an optical measuring instrument.

The optical signal attenuator for optical communication is an optical component having a set of input and output waveguides for causing a certain magnitude of optical loss to input light and outputting attenuated optical power.

In the optical communication, the optical communication power level is different according to a system configuration and includes the difference in transmission loss of optical fiber due to transmission distance, the number of optical fiber coupling portions, the number and performance of optical components such as optical divider/coupler used in transmission lines. When the optical receiving level is excessive, the optical attenuator is used for adjustment of the optical receiving level.

In addition, the optical attenuator has representative applications such as estimation, adjustment and correction about the communication instruments or the optical measurement instruments.

According to the aspect of functions thereof, the optical attenuator can be classified into a fixed optical attenuator for applying a certain quantity of attenuation to light, and a variable optical attenuator (VOA) capable of varying the quantity of attenuation.

Also, it is important for the optical attenuator to have the fixed quantity of attenuation according to wavelength in the used wavelength range.

The variable optical attenuator of the prior art is generally classified into a waveguide-type attenuator using a thermo-optic effect of silica or polymer-based material, a mechanical connector-type large-sized attenuator and an MEMS attenuator using an MEMS actuator.

FIGS. 1 and 2 schematically show a shutter-type MEMS variable optical attenuator of the related art.

The reference number 41 designates a transmitting fiber, 42 designates a receiving fiber, 43 designates a movable shutter, 44 designates connecting means, and 45 designates a shutter portion of the movable shutter 43.

FIG. 1 depicts the shutter-type MEMS variable optical attenuator of the prior art before the movable shutter is operated, in which transmission is made from the transmitting fiber 41 to the receiving fiber 42 without attenuation of an optical signal.

FIG. 2 depicts the shutter-type MEMS variable optical attenuator of the prior art after the movable shutter is operated, in which the optical signal is transmitted from the transmitting fiber 41 to the receiving fiber 42 after being attenuated as much as screened by the shutter portion 45.

In such a shutter-type MEMS variable optical attenuator, the movable shutter 43 is positioned between a pair of transmitting/receiving fibers and the connection area between the two optical fibers 41 and 42 is adjusted according to displacement of the movable shutter 43 in order to control insertion loss.

However, such a shutter-type variable optical attenuator has a drawback that the optical signal returns to the transmitting fiber 41 reflected from the movable shutter 43 in which the influence of the returning optical signal should be minimized.

FIGS. 3 and 4 schematically show a micro-rotational mirror-type MEMS attenuator of the related art, in which the reference number 51 is an input fiber, 52 is a lens, and 54 is an output fiber.

FIG. 3 depicts the micro-rotational mirror-type MEMS attenuator of the prior art before the mirror is inclined, in which an optical signal from the input fiber 51 is focused through the lens 52, reflected by the mirror 53, and then focused through the lens 52 again to proceed into the output fiber 54 without being attenuated.

FIG. 4 depicts the micro-rotational mirror-type MEMS attenuator of the prior art after the mirror is inclined, in which the optical signal from the input fiber 51 is focused through the lens 52, reflected by the inclined mirror 53, and then focused through the lens 52 to proceed into the output fiber 54 as attenuated as much as the mirror is inclined.

Accordingly, in the micro-rotational mirror-type variable optical attenuator, the input/output optical fibers 51 and 52 are connected using reflection of the mirror and each displacement of the mirror is used to control insertion loss.

However, such a micro-rotational mirror-type variable optical attenuator has a drawback that the mirror 53 should be mounted parallel to the substrate so that a difficult packaging is required in which the optical fibers is perpendicularly assembled to the substrate.

Also, even the variable optical attenuator of the same MEMS type can have a difference in performance according to the configuration and shape. Also, in the MEMS structure, the optical fiber, micro-mirror, lens and so on require precise alignment, and in the aspect of the device, it is advantageous to arrange the optical fiber parallel to the substrate rather than to arrange the optical fiber vertical to the device substrate.

However, in the rotational mirror-type MEMS variable optical attenuator, manufacture of the rotational mirror and use of a collimator lens are necessary and a structure of arranging the optical fiber vertically to the substrate is required. On the other hand, while the structure of the shutter-type MEMS variable optical attenuator does not require the collimator and the optical fiber can be arranged parallel to the substrate, light reflected from the shutter returns to the transmitting fiber causing a noise signal.

SUMMARY OF THE INVENTION

Accordingly, the present invention has been proposed to solve the foregoing problems of the prior art and it is an object of the invention to provide a path-converted variable optical attenuator which adopts an MEMS type and reflects an optical signal to a separate path from paths of transmitting/receiving fibers, when the optical signal of the transmitting fiber emerges to the receiving fiber, so that attenuation may not vary according to wavelength.

According to an embodiment of the invention to solve the foregoing object, it is provided a path-converted variable optical attenuator comprising: a transmitting fiber for launching an optical signal through a transmitting core; a receiving fiber for receiving the optical signal from the transmitting fiber through a receiving core; and a mirror having a reflector for obstructing the optical signal launched from the transmitting core of the transmitting fiber from proceeding into the receiving core of the receiving fiber, and being displaced in a direction allowing a portion of the optical signal of the transmitting fiber into the receiving fiber to attenuate the optical signal.

DETAILED DESCRIPTION OF THE PREFERRED EMBODIMENT

Hereinafter detailed description will be made about a variable optical attenuator of optical path conversion (hereinafter will be referred to as path-converted variable optical attenuator) according to a preferred embodiment of the invention in reference to the accompanying drawings.

Figure 1:
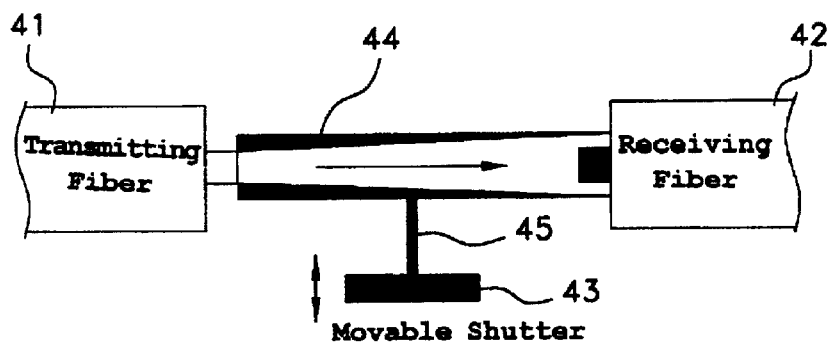
FIG. 1 schematically shows a shutter-type MEMS variable optical attenuator of the related art.
Figure 2:
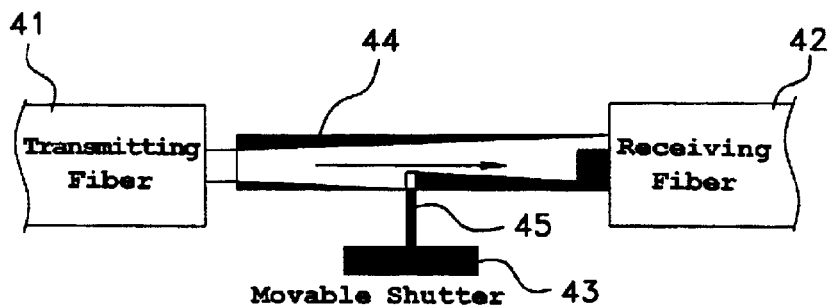
FIG. 2 schematically shows the shutter-type MEMS variable optical attenuator shown in FIG. 1 with a movable shutter being moved.
Figure 3:
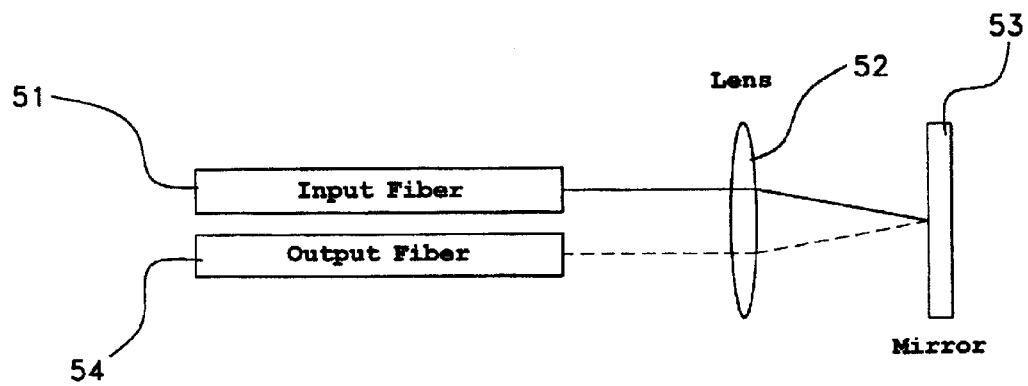
FIG. 3 schematically shows a micro-rotational mirror-type MEMS attenuator of the related art.
Figure 4:
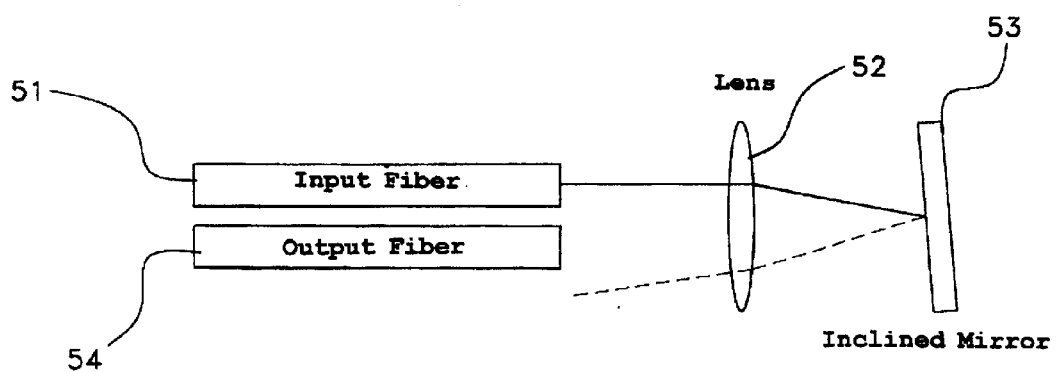
FIG. 4 schematically shows the micro-rotational mirror-type MEMS attenuator shown in FIG. 3 with a mirror being inclined.
Figure 5:
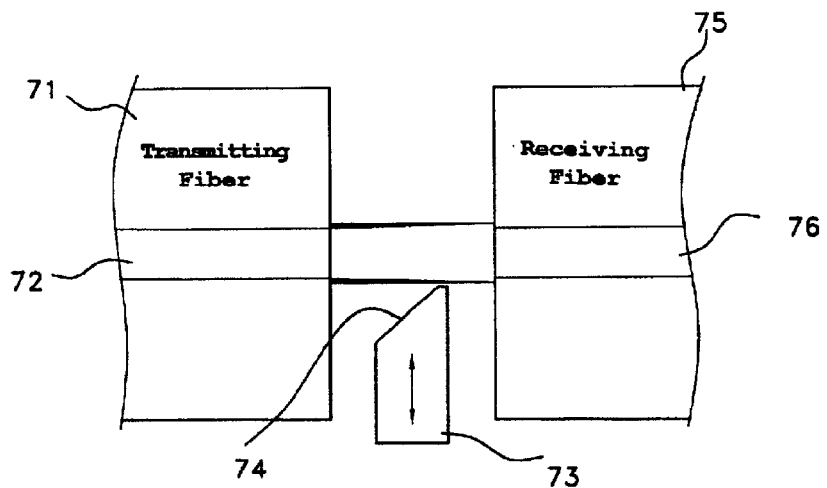
FIG. 5 schematically shows a path-converted variable optical attenuator of the invention.
Figure 6:
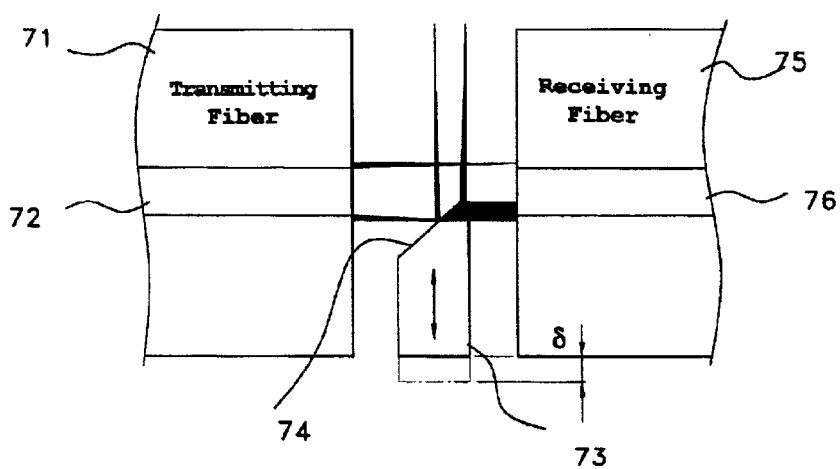
FIG. 6 schematically shows the path-converted variable optical attenuator shown in FIG. 5 with a mirror being moved.

FIGS. 5 and 6 schematically show the path-converted variable optical attenuator according to the invention.

As shown in FIGS. 5 and 6, the path-converted variable optical attenuator is comprised of a transmitting optical fiber 71 for launching an optical signal through a transmitting core 72; a receiving fiber for receiving the optical fiber from the transmitting fiber 71 through a receiving core 76; a reflector 74 for obstructing the optical signal from the transmitting core 72 into the receiving core 76; a mirror 73 for being displaced in a random direction allowing only a portion of the optical signal from the transmitting fiber 71 to launch into the receiving fiber 75 thereby attenuating the optical signal.

The mirror 73 is linearly displaced in a direction perpendicular to an optical path between the transmitting fiber 71 and the receiving fiber 75 and the reflector 74 of the mirror 73 is composed of a side of inclination so that the optical signal launched from the transmitting fiber 71 is reflected by the reflector 74 of the mirror 73 along a path that does not coincide with the optical path between the transmitting/receiving fibers 71 and 75.

Figure 7:
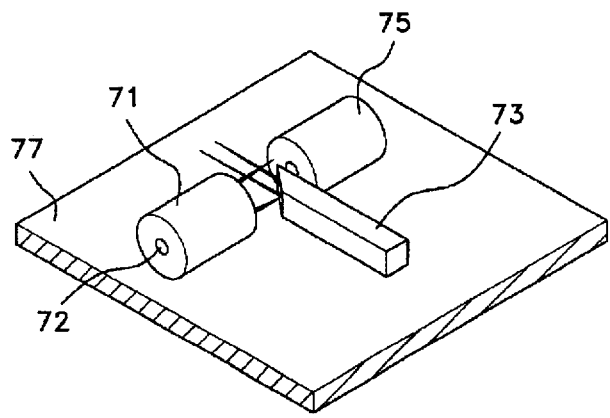
FIG. 7 is a perspective view of the path-converted variable optical attenuator shown in FIG. 5, which is mounted on a substrate.

FIG. 7 is a perspective view of the path-converted variable optical attenuator shown in FIG. 5 which is mounted on a substrate.

As shown in FIG. 7, the path-converted variable optical attenuator further comprises a substrate 77 which is arranged in parallel to the transmitting fiber 71, the receiving fiber 75 and the mirror 73.

Figure 8:
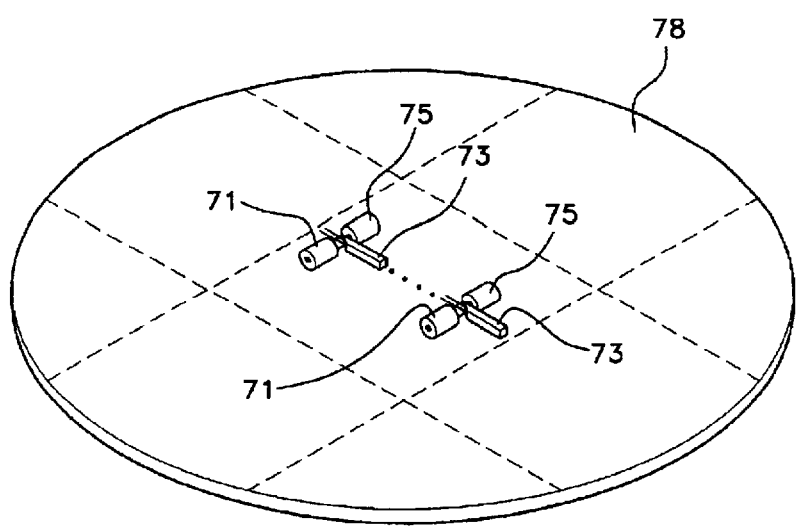
FIG. 8 is a perspective view of a plurality of the path-converted variable optical attenuator shown in FIG. 5, which is mounted on a semiconductor wafer.

FIG. 8 is a perspective view of a plurality of the path-converted variable optical attenuator shown in FIG. 5 which is mounted on a semiconductor wafer.

As shown in FIG. 8, a structure is constituted by further comprising a semiconductor wafer 78 which is arranged in parallel to the transmitting fibers 71, the receiving fibers 75 and the mirrors 73, in which each of the plurality of transmitting fibers 71, each of the plurality of receiving fibers 75 and each of the plurality of mirrors 73 constitute a set for enabling attenuation of each optical signal.

Figure 9:
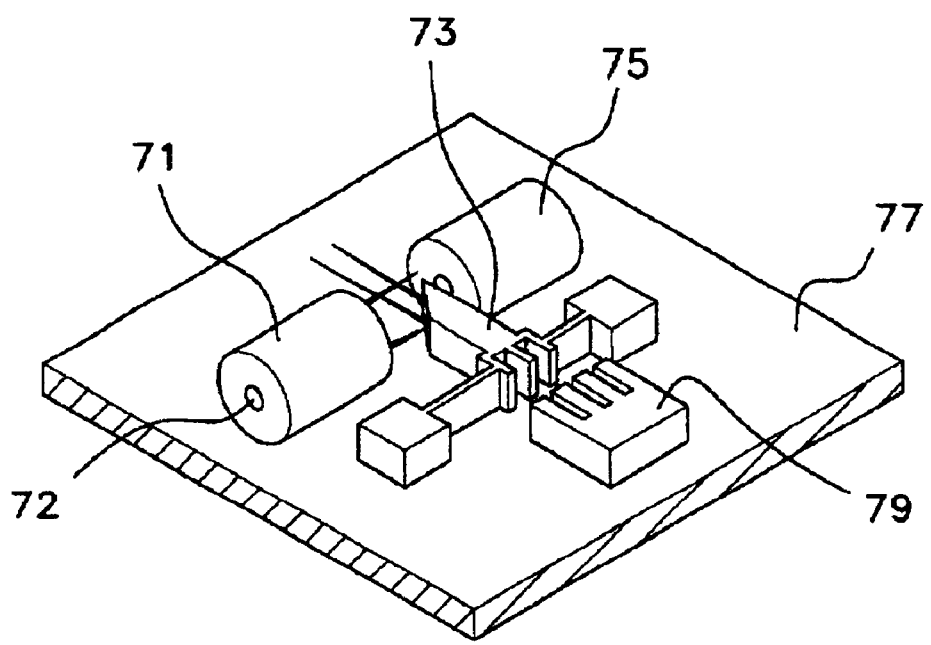
FIG. 9 is a perspective view of the path-converted variable optical attenuator shown in FIG. 5 mounted with an MEMS actuator.

FIG. 9 is a perspective view of the path-converted variable optical attenuator shown in FIG. 5 mounted with an MEMS actuator.

As shown in FIG. 9, the path-converted variable optical attenuator further comprises an MEMS actuator 79 for controlling the mirror 73 to linearly move in a direction perpendicular to the optical path between the transmitting fiber 71 and the receiving fiber 75.

Detailed description will be made about the operation of the path-converted variable optical attenuator of the invention of this configuration as follows.

First, the invention proposes a novel structure of path-converted variable optical attenuator, in which an MEMS type is adopted to solve performance problems generated from variable optical attenuators of the prior art and consideration is made about relative alignment with the optical fibers and avoidance of optical signal interference.

Therefore, the path-converted variable optical attenuator of the invention uses an MEMS actuator 79, and excellent performance can be expected since insertion loss is low and there is no loss due to polarization or wavelength dependency. Further, the size and price of the path-converted variable optical attenuator is remarkably reduced compared to a mechanical connector-type attenuator of the prior art so that development of a product excellent in competitiveness can be expected.

FIG. 5 shows the path-converted variable optical attenuator, in which the mirror 73 is not displaced in the direction perpendicular to the optical path between the transmitting/receiving fibers 71 and 75.

In this case, the optical signal launched through the transmitting core 72 of the transmitting fiber 71 proceeds into the receiving core 76 of the receiving fiber 75 without being attenuated.

FIG. 6 shows the path-converted variable optical attenuator, in which the mirror 73 is displaced in the direction perpendicular to the optical path between the transmitting/receiving fibers 71 and 75.

In this case, a portion of the optical signal reflected from the reflector 74 displaced as much as a gap 6 proceeds along a path separate from the optical path between the transmitting/receiving fibers 71 and 75 to extinguish. Also, rest of the optical signal from the transmitting core 72 of the transmitting fiber 71 does not collides into the reflector 74 of the mirror 73 to linearly move into the receiving core 76 of the receiving fiber 75 as attenuated. Thus, optical signal from transmitting fiber 71 is received to receiving fiber 75 which is attenuated as a gap 6.

Therefore, since a part of transmitted light is partially reflected and proceeds along a different path when the movable mirror 73 is moved to the perpendicular direction to the optical path between the transmitting/receiving fibers 71 and 75, the receiving fiber 75 receives light in decreased quantity. Thus, the reflector 74 of the mirror 73 is composed of a side of inclination. This Reflector 74 reflects along the different path of the optical signal from the transmitting fiber 71 and does not reflect to the direction of transmitting fiber 71. Therefore, it is not generated that optical interference and noise hereby.

Also, as shown in FIG. 7, the optical fibers 71 and 75 can be arranged parallel to the substrate 77.

Further, as shown in FIG. 8, the plurality of path-converted variable optical attenuators can be mounted on the semiconductor wafer 78. In other words, the plurality of path-converted variable optical attenuators are installed with each of the attenuators having the each transmitting fiber 71, the each receiving fiber 75 and the each mirror 73 as one set. Then, the plurality of path-converted variable optical attenuators installed on the semiconductor wafer 78 can respectively attenuate the plurality of optical signals to output attenuated signals.

The micro-mirror perpendicularly distanced from the substrate 77, as shown in FIG. 9, is connected to the linearly movable MEMS actuator 79. Thus, the attenuation quantity of light is adjusted by the displacement of the mirror 73 which is adjusted according to the control operation of the MEMS actuator 79.

In this case, the MEMS actuator 79 is made by application of a semiconductor manufacturing technology. Also, micro-optics and ultimate devices can be used. The mirror 73 as the connected apparatus can be displaced by the drive of the MEMS actuator 79.

As described hereinbefore, the path-converted variable optical attenuator of the invention adopts the MEMS type and reflects the optical signal launched from the transmitting fiber to the receiving fiber along the path different from the path of the transmitting/receiving fibers so that the quantity of attenuation may not be varied according to wavelength as an effect thereof.

Also, the invention is excellent in loss features because it is low wavelength dependency that a waveguide-type variable optical attenuator or an MARS-type variable optical attenuator have in the prior art, and can be developed as products with low price and small size compared to the mechanical variable optical attenuator, thus has remarkably excellent performance in loss features, wavelength dependency and miniaturization compared to variable optical attenuator of other driving type.

Further, the path-converted variable optical attenuator of the invention has the optical path with no back reflection, i.e., the optical signal is directly reflected from the mirror and returns to the transmitting fiber and the attenuated quantity of light may not influence the transmitting or receiving fiber.

Moreover, the path-converted variable optical attenuator of the invention allows the optical fibers to be arranged parallel to the substrate and adjacent to each other for eliminating necessity of the collimator thereby having an effect to avoid complexity of structure that the rotational mirror-type MEMS variable optical attenuator.

Further, the invention provides micro-adjustment using the MEMS actuator different from the conventional reflector-type variable optical attenuator using a motor, and thus has an effect that attenuation can be made while constantly maintaining Gaussian distribution of the optical signal. Moreover, coupling efficiency, back lash and product size caused by use of the motor can be solved.

While it has been described about the preferred embodiment of the invention, the present invention can adopt a number of variations, modification and equilibriums. It is apparent that the embodiment can be suitably varied and equally applied in the invention. Therefore, the foregoing description shall not restrict the scope of the invention which will be defined by the following claims.

What is claimed is:

1. A path-converted variable optical attenuator comprising:

a transmitting fiber for launching an optical signal through a transmitting core;

a receiving fiber for receiving the optical signal from said transmitting fiber through a receiving core; and a mirror having a reflector for obstructing the optical signal launched from said transmitting core of said transmitting fiber from proceeding into said receiving core of said receiving fiber, and being displaced in a direction allowing a portion of the optical signal of said transmitting fiber into said receiving fiber to attenuate the optical signal;

wherein said mirror is linearly displaced in a direction perpendicular to an optical path between said transmitting fiber and said receiving fiber, wherein said reflector of said mirror has an inclination relative to the optical path, the optical signal launched from said transmitting fiber and reflected by said reflector of said mirror being reflected in a path that does not coincide with the optical path between said transmitting fiber and said receiving fiber;

a further transmitting fiber for launching a further optical signal through a further transmitting core;

a further receiving fiber for receiving the further optical signal through a further receiving core; and a further mirror having a reflector for obstructing the further optical signal between said further transmitting core and said further receiving care by being linearly displaced in a direction perpendicular to the further optical path, said reflector of said further mirror having an inclination relative to the further optical path, reflecting any obstructed portion of the further optical signal in a path that does not coincide with the optical path between said further transmitting fiber and said further receiving fiber, to attenuate the further optical signal;

the transmitting fiber, the receiving fiber and the mirror constituting a group, and the further transmitting fiber, the further receiving fiber and the further mirror constituting a further group, the group and further group enabling attenuation of the optical signal and the further optical signal, respectively; and a semiconductor wafer arranged parallel to said transmitting fiber, and further transmitting fiber to said receiving fiber and said further receiving fiber and to said mirror and said further mirror.

2. A path-converted variable optical attenuator in accordance with claim 1, wherein said mirror is wedge shaped.

3. The path-converted variable optical attenuator according to claim 1, further comprising a substrate arranged parallel to said transmitting fiber, said receiving fiber and said mirror.

4. The path-converted variable optical attenuator according to claim 1, further comprising an MEMS actuator for controlling said mirror to be linearly displaced in a direction perpendicular to an optical path between said transmitting fiber and said receiving fiber.

5. A path-converted variable optical attenuator in accordance with claim 1, wherein said mirror is wedge shaped.

6. A path-converted variable optical attenuator comprising:

a plurality of transmitting fibers each launching a respective optical signal through a transmitting core;

a plurality of mirrors each having a reflector for obstructing a respective optical signal launched from said transmitting core from proceeding into a receiving core of a plurality of receiving fibers, said mirrors being displaced in a direction allowing attenuation of a portion of the respective optical signal from said plurality of transmitting fibers into respective receiving fibers, wherein each of said plurality of transmitting fibers, the respective one of said plurality of receiving fibers and the respective one of said plurality of mirrors constitute a group to enable attenuation of the respective optical signal; and a semiconductor wafer arranged parallel to said plurality of transmitting fibers, said plurality of receiving fibers and said plurality of mirrors.

* * * * *